United States Patent
Bernstein et al.

[11] Patent Number: 6,066,295
[45] Date of Patent: *May 23, 2000

[54] SYSTEM AND METHOD FOR REMOTE DETECTION AND REMEDIATION OF AIRBORNE AND WATERBORNE CHEMICAL/BIOLOGICAL AGENTS

[75] Inventors: Lawrence Steven Bernstein, Lexington; Mitchelle Ross Zakin, Andover, both of Mass.

[73] Assignee: Spectral Sciences, Inc., Burlington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/656,632

[22] Filed: May 31, 1996

[51] Int. Cl.[7] .............................. G01N 27/00; A62B 7/08
[52] U.S. Cl. .............................. 422/50; 422/98; 422/120; 250/341
[58] Field of Search .............................. 250/341; 422/50, 422/98, 120

[56] References Cited

U.S. PATENT DOCUMENTS

| | | | |
|---|---|---|---|
| 4,406,227 | 9/1983 | Beeker et al. | 102/505 |
| 4,425,503 | 1/1984 | Watkins et al. | 250/345 |
| 4,496,839 | 1/1985 | Bernstein et al. | 250/341 |
| 4,720,058 | 1/1988 | Jaeger | 244/3.15 |
| 5,096,293 | 3/1992 | Cecchi et al. | 356/318 |
| 5,145,645 | 9/1992 | Zakin et al. | 422/98 |
| 5,157,257 | 10/1992 | Geiger | 250/338.5 |
| 5,221,927 | 6/1993 | Palmer | 342/26 |
| 5,250,810 | 10/1993 | Geiger | 250/338.5 |
| 5,257,085 | 10/1993 | Ulich et al. | 356/73 |
| 5,357,865 | 10/1994 | Mather | 102/361 |
| 5,450,125 | 9/1995 | Ulich et al. | 348/31 |

FOREIGN PATENT DOCUMENTS

195 02 548  8/1995  Germany .................. B01D 53/30

*Primary Examiner*—Hankyel Park
*Attorney, Agent, or Firm*—Hamilton, Brook, Smith & Reynolds, P.C.

[57] ABSTRACT

A method and device for remotely analyzing an agent dispersed in the atmosphere is disclosed in which a body is dispensed into a volumetric region of the atmosphere overlapping the region containing the agent. The body is tailored to induce changes in an electromagnetic response of the volumetric region including the agent due to body the reactive probe and the agent. By sensing electromagnetic radiation from the region, information may be gained concerning the agent based upon the new electromagnetic response of the volumetric region induced by the reactions. Since a probe is used, source need not be known, and the electromagnetic signature may be tailored to atmospheric and device limitations.

23 Claims, 5 Drawing Sheets

SYSTEM AND METHOD FOR REMOTE DETECTION AND REMEDIATION OF AIRBORNE AND WATERBORNE CHEMICAL/BIOLOGICAL AGENTS

BACKGROUND OF THE INVENTION

Rapid, accurate long-range detection of hazardous chemical/biological target agents including environmental toxins remains a formidable problem. In the military sector, early warning is necessary to protect troops from battlefield releases of chemical and biological weapons. This requires the ability to perform stand-off detection, identification, and quantification of the composition of the releases at distances ranging from 1 to 150 km or more. Such analysis must be performed quickly enough to permit personnel to either evacuate their position or deploy some other appropriate protective measure such as putting on a gas mask and/or protective clothing. In the industrial sector, rapid identification and quantification of chemical spills and/or accidental releases from chemical plants and the like is critical for protecting the well-being of surrounding residents. In both sectors, rapid and efficient containment and remediation of the chemical/biological release is desired to minimize the spatial extent of the release and to destroy the active hazardous species. This is particularly crucial for typical battlefield scenarios in which chemical and biological weaponry may be rapidly deployed.

To date, attempts at achieving long-range detection of chemical and biological agents have been only moderately successful. The current technique-light detection and ranging (LIDAR) with differential absorption (DIAL) has been employed for detection of warfare agents. DIAL systems are remote sensing devices that use a laser to illuminate a body or target. An optical system collects the backscattered radiation to derive target information, such as spectral reflectance/absorption, fluorescence, Raman scattering, or phosphorescence. In one example, LIDAR was used to detect tryptophan fluorescence as an indicator of biological agents.

LIDAR and DIAL chemical and biological techniques do have several important features for detection of agents. They have long-range transmission in atmospheric window regions and rapid response; hardware is readily available. LIDAR and DIAL can look at very narrow wavelength regions for specificity and observe individual molecular absorption lines while DIAL uses multiple wavelengths to enhance selectivity.

SUMMARY OF THE INVENTION

Unfortunately, LIDAR and DIAL are plagued by several key problems. Range can be too short in UV or IR non-window regions where the chemical/biological agent may have a unique electromagnetic signature. Thus, the techniques will not yield adequate early-warning. In addition, battlefield interferents such as dust, pollen, rain, aerosols, smoke, and the like provide strong return signals that can give rise to false-positive indications of the presence of agents, and/or mask the presence of an agent.

The present invention provides improved detection by the use of bodies, which may be in gaseous (molecules), liquid (aerosols, etc.), or solid (particles, etc.) form, and which are dispersed in a volume containing the agent to be detected. They are selected to interact in some manner with the targeted agent to provide a change in the electromagnetic signature of either the bodies or the surrounding probed volume, such change being optimized for read-out and interrogation with standard DIAL or other electromagnetic detection technique. As a result, the electromagnetic signature of the volume containing the agent is tailored to the detection system allowing the analysis of agents that would otherwise be indistinguishable by the system, increasing range, or both.

In general, according to one aspect, the invention features a method for remotely analyzing a chemical and/or biological target agent dispersed in a volumetric region of a medium, such as the atmosphere or a body of water, a lake or the ocean for example. The method comprises selecting a body that will reside and interact with the target agent in the medium. The interactions are tailored to induce changes in an electromagnetic signature of the region occupied by the target agent. Once selected, the body is seeded into the medium overlapping the region occupied by the target agent, and the seeded region is analyzed based upon a new electromagnetic signature that was induced by interactions between the body and the target agent.

In specific embodiments, the body chemically reacts with the agent. The information about the original agent may be gained by detecting electromagnetic signatures for the product of the body-agent reaction.

In other embodiments, the bod physically reacts with the agent to effect changes in color size, morphology, phase, and/or electrical conductivity.

The body may be transported to the agent species according to a variety of mechanisms. For example, the body may be sprayed from an aircraft, carried in artillery shells, or placed in a remotely triggered perimeter of explosive or pressurized devices. In situations in which the source of the agent is known and fixed, e.g, smoke stack, the body is dispersed upwind and allowed to drift to the source.

In still other embodiments, the body may be formulated to react with a plurality of different agents, or plural types of bodies may be included each reacting with different agents, in each case producing identifiable signatures.

In general, according to another aspect, the invention also features a system for remote agent detection. Again a body is used that will reside in the medium and will interact with the target agent to induce changes in an electromagnetic signature of the region occupied by the target agent. A delivery system seeds the body in the medium. An airplane is one example. The body may also be carried on or from a balloon, for example. In either case, an electromagnetic signature detection system detects electromagnetic radiation from the seeded region and analyzes the target agent based upon a new electromagnetic signature from the region that was induced by the interactions between the body and the target agent.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMOBIDMENTS

Figure 1:
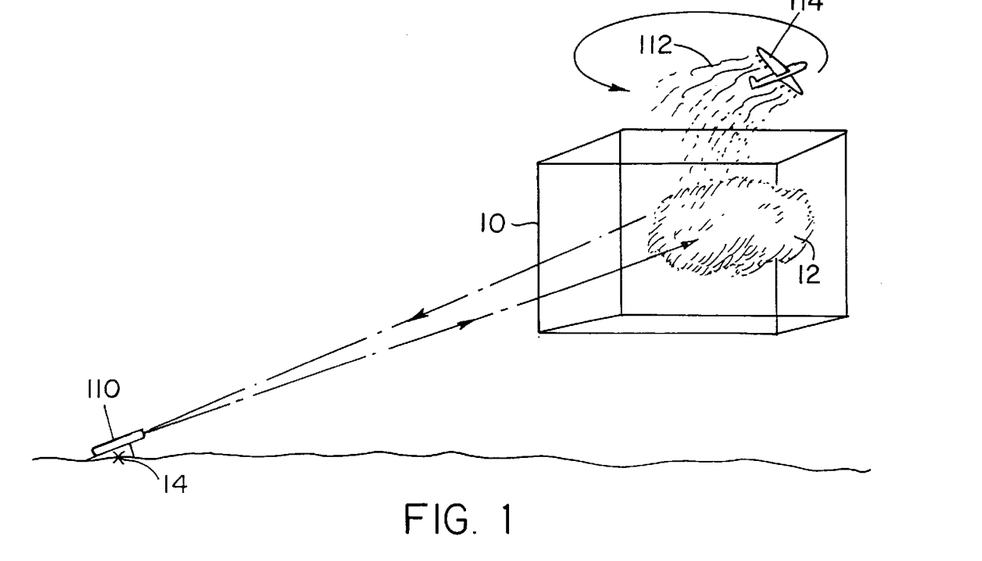
FIG. 1 is a schematic diagram illustrating the operation of the agent detection system of the present invention.

FIG. 1 shows a remote chemical and/or biological species detection and remediation system 100 that has been constructed according to the principles of the present invention.

A volumetric section of the atmosphere 10 is known to contain or may contain chemical and or biological agents 12 of interest in some region. In the battlefield scenario, the volumetric section 10 may be contaminated by a chemical artillery shell burst or similar chemical or biological threat such as an upwind release. Alternatively, it could also be a region downwind of a factory that has released a toxic chemical in the case of an industrial accident.

While being remote from the point of observation, e.g., 1–150 km, the electromagnetic characteristics of the volumetric section 10 is probed by an electromagnetic signature detection system 110, which detects electromagnetic radiation from the section. The detection can be based upon active or passive probing. Active DIAL systems are the preferred here because the multi-wavelength technique factors-out time and spatial inhomogeneities. An example of a system is disclosed in U.S. Pat. No. 5,257,085, which is incorporated herein in its entirety by this reference. LIDAR, radar, Raman, laser, spotlight are other actively probing alternatives, however. In some scenarios, the passive approaches such as systems relying on scattered sunlight or thermal emission detection chemiluminescent reactions, fluorescence, or phosphorescence are used to probe the volumetric section 10.

The nature of the targeted agent contaminant 12, however, will make it insusceptible to direct analysis in most situations. The agent may not have a unique electromagnetic signature, or if a signature exists, the unique spectral features may not be present in a region of the spectrum that is accessible to the signature detection system 110. DIAL systems, for example, rely on high powered lasers to interrogate specific spectral lines that are indicative of the agent. These lasers, however, may not be available at the required wavelengths. Moreover, low atmospheric transmissivity in the critical spectral region may severely restrict the system's range such as in the UV or the non-window IR. Similarly, the agent may not have the conductive/dielectric properties that render it detectable by a radar system.

In order to affect the electromagnetic characteristics or create an unique signature that is accessible by the system 110, a reactive probe or body 112 is distributed throughout the interrogated section 10. The bodies 112 are selected to induce a change in the electromagnetic signature of the volumetric section 12 containing the targeted agent by interacting with it. And, these changes are tailored or preselected to be detectable by the signature detection system 110, enabling the type, density, distribution, and/or quantity of the airborne agent to be determined.

In the illustrated example, the reactive bodies 112 are introduced into the volume 10 from an aircraft 114 in the fashion of a crop duster. Where the chemical or biological agents are dangerous or toxic to humans, the body is preferably distributed remotely, such as by a remotely piloted aircraft. The bodies are introduced and dispersed from an artillery shell or guided missile in other embodiments. Remotely activated landmine-type devices are still another option. In this case, the devices are distributed at the perimeter of a military installation or along the front line of battle. If a chemical/biological agent attack are suspected, the landmine devices are triggered to disperse the reactive agent. The approach also has industrial applications in which dispensing devices are placed around the perimeter of a chemical facility to distribute the bodies in the case of a toxic chemical release.

The reactive bodies 112 may take a number of different forms. For example, gaseous (molecules), liquid (aerosols, etc.), or solid (particles, etc.) bodies are possible. Various morphologies are also possible, including particulates of spherical or other shape, sheets, strings, or otherwise. In other embodiments, they may be attached to an airborne structure such as a balloon or towed by an airplane.

The particles of the reactive bodies preferably have a long residence time in the volumetric section 10. Usually, the particle size is tailored to the predicted characteristics of the targeted agent. This allows interaction with the targeted agent in sufficient quantities to enable the system 110 to detect the changes in the electromagnetic characteristics of the atmospheric section caused by the combined presence of the target agent and the reactive bodies.

It may occur that the type of the target agent is unknown or one of a number of different species. The system is tailored to this scenario by releasing multiple types of reactive bodies, or bodies that contain a number of different specific probes. In addition, a single type of body may have more than one reactive chemistry built in. The bodies are preferably selected to yield unique signatures in the presence of the different agents. The signature detection system 110 interrogates section 10 for the different signatures and applies a pattern matching scheme to identify the particular target species present in the interrogated section 10. In fact the pattern matching approach generally provides better selectivity.

The reactive bodies interact with the agent 12 in one or more different ways. In one implementation, a chemical reaction produces a reaction product which may or may not remain absorbed onto the reactive bodies (it may also be released into the air). Adsorption or absorption of the target agent onto the reactive body are other alternatives. Alternatively or additionally, physical changes may be induced such as color change (i.e., change in absorption and/or emission cross-section), change in size or morphology (which change scattering cross-section), change in phase, i.g. liquid to solid (which changes scattering cross-section), and changes in electrical conductivity of reactive body (which changes radar return signal).

A surfactant body, which reduces surface tension tending to induce a reduction in the average size of the targeted agent's particles, is one example. If a narrow particle size distribution results, the size may be detected by determining a scattering angle wavelength dependency. Light-sizing is another alternative, which relies on the frequency dependent movement of particles in response to an acoustic wave. Particles with viscous damping times comparable to the reciprocal of the acoustic frequency give rise to a frequency-dependent LIDAR-acoustic modulation signal. One example of this is shown in U.S. Pat. No. 5,221,927 to Palmer, which is incorporated herein by this reference.

If the return signal is not strong enough, non-interacting bodies, e.g., polymer, dust, aerosols, metal spheres, or chaff, can be additionally dispersed in the interrogated section 10 to boost the signal-to-noise ratio by increasing backscattering for a DIAL system, for example. Alternatively, the composition of reactive bodies can be readily tailored to optimize return signal, signal-to-noise ratio, for specific agents. In some environments, They are preferably tailored to provide selectivity, i.e. discrimination against interferents such as pollen, dust, and/or aerosols.

Figure 2:
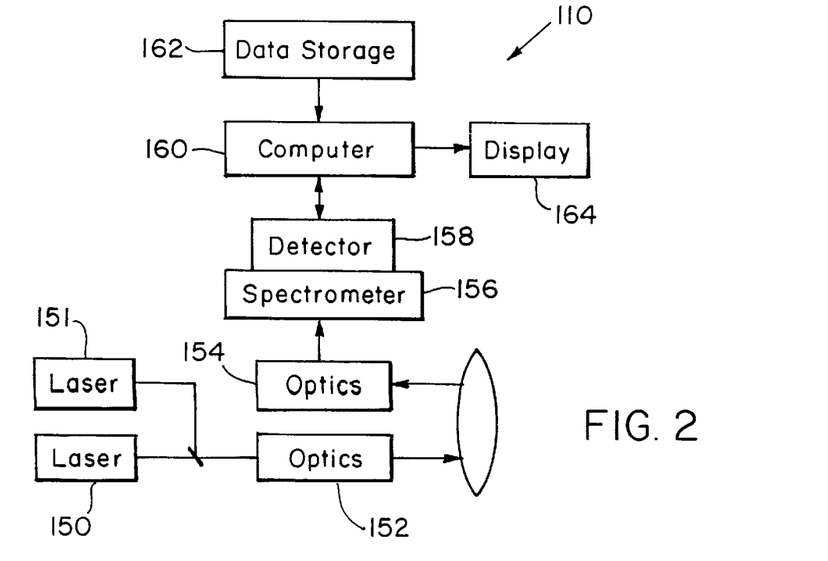
FIG. 2 is a block diagram showing the components of the DIAL detection system.

FIG. 2 is a block diagram showing the principal components of the DIAL system. Lasers 150,151 or other electromagnetic radiation source generate the signal that is used to access the electromagnetic signature of the volumetric section 10. Transmission optics 152 determine the size of the projected beam. Return optics 154, typically a catadioptric or entirely reflective system, collects the returning light and provides it to a spectrometer 156 and detector 158, which is a charge coupled device (CCD) array. A computer system 160 and data storage 162 identify the target agent by determining the electromagnetic absorption of the agent at two or more frequencies. The frequencies are selected so that the response at one frequency will change with the body-agent interaction while the response at the other frequency will be unaffected. Any changes are detected by comparing the responses at these two frequencies. The reaction-unaffected frequency is used to normalize the signal for the reaction-affected frequency. A pattern matching algorithm is used to analyze the agent, including type, density, total quantity, direction, and volumetric extent, which may be provided to display 164.

Figure 3:
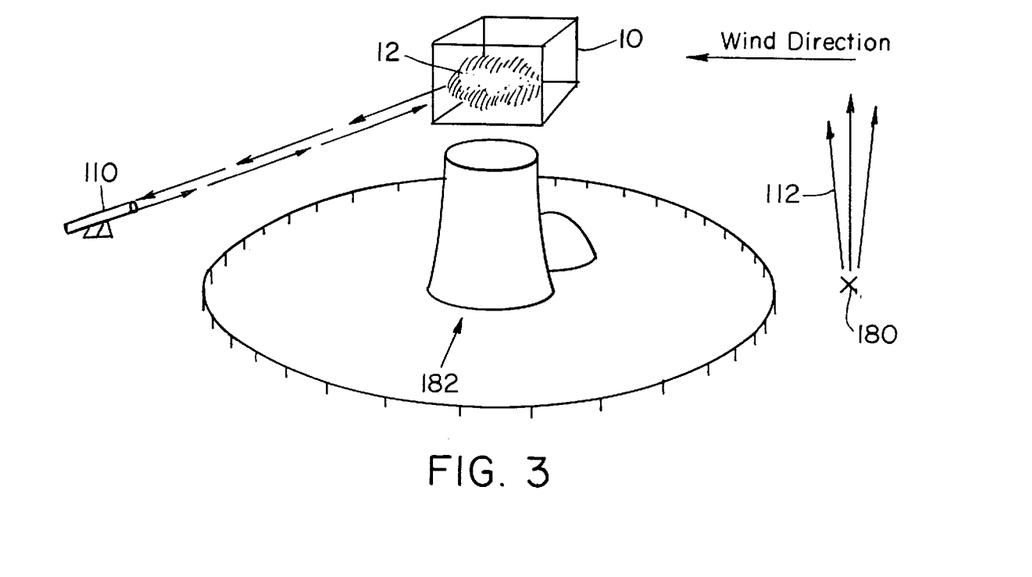
FIG. 3 is a schematic diagram showing the inventive system used to detect industrial pollution.

As shown in FIG. 3, the present invention is also valid when the target agent are unknown, but the location is fixed. For example, if the exhaust from a chemical plant 182 were to be tested, but the plant is otherwise inaccessible, the body is introduced into the atmosphere upwind of the plant at point 180. The drifting atmosphere carries the probe to the plant where the interaction occurs if the chemical agent of interest is present. The signature detection system 110 aimed at this region detects the signatures that are indicative of the chemical agent's presence.

Figure 4:
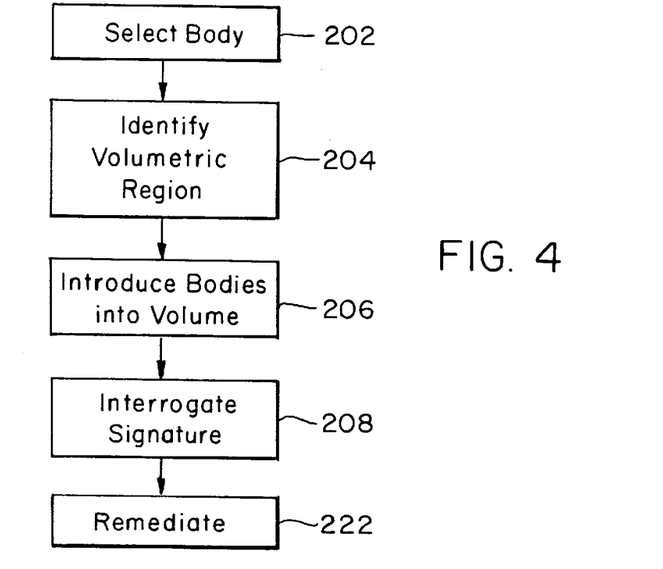
FIG. 4 is a flow diagram illustrating a method for locating and identifying atmospheric agents according to the principles of the present invention.

FIG. 4 is a flow diagram illustrating the remote detection method.

Based on the knowledge of the agent, a body 112 is selected that will interact with the agent to provide and unique and accessible electromagnetic signature in step 202. If the type of the agent is unclear, multiple bodies or probes on the bodies are selected.

The volumetric section 10 of the atmosphere is defined to receive the reactive body 112 in step 204. This step is driven by the type and nature of the release and current atmospheric conditions. The volume 10 is preferably defined to be large enough to encompass all of the agent.

The reactive body is introduced into the section of the atmosphere 10, in step 206. Sufficient time must elapse to allow for the body-agent reaction. In military applications, the time is preferably short, seconds to minutes. In tracking applications, a longer half-life may be desirable especially if the product decays. In either case, the electromagnetic signature of the section 10 is interrogated in step 208 by the signature detection system 110 that determines the type, quantity, extent of the agent. Remediation may then occur, step 222.

Steps 202–222 are preferably repeated to provide further analysis especially where it becomes apparent that the defined volume does not encompass the entirety of the release or where remediation was not entirely successful.

Figure 5:
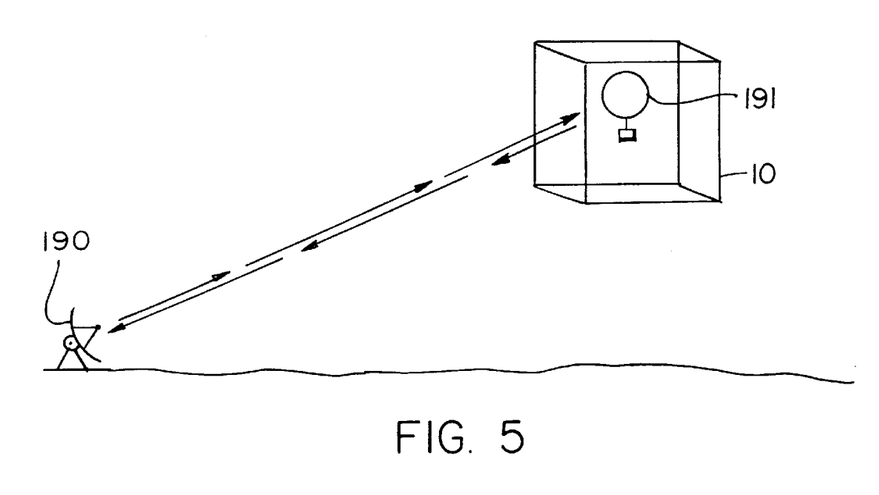
FIG. 5 is a schematic diagram illustrating the operation of another embodiment of the invention.

FIG. 5 shows another embodiment in which radar 190 is used to locate the targeted agent in volume 10. In this case, a conductive polymer probe is used that undergoes changes in conductivity in the presence of the agent. The polymer is carried by or painted on a balloon 191, for example. Generally, due to longer wavelengths radar requires larger structures to interrogate. The radar detects when the polymer has been exposed to the agent by monitoring the balloons return signal.

While, the detection system 100 has been described in connection with monitoring and analyzing atmospheric releases of biological/chemical agents, it is equally applicable to similar releases in a water medium, such as the ocean. In this instance, the bodies are adapted to remain suspended in the water medium. The induced or preselected signature change, however, must be tailored to the transmissive characteristics of the medium, ocean water. In one example, the agent would be released near the effluent discharge part of a factory, for example, to monitor the level and distribution of pollution from the pipe.

Remediation Phase

Once the location, type, extent, and total mass of chemical/biological species has been identified, steps are then be taken to mitigate the effects of or neutralize the agent, step 222 at FIG. 4. In some situation, however, it is preferable to avoid the time consumption associated with the detection phase and immediately perform the remediation, but detection first makes the remediation more efficient. The remediating chemical can be released using the same mechanism used for the body. It can be delivered by aircraft or artillery shell, for example.

Figure 6:
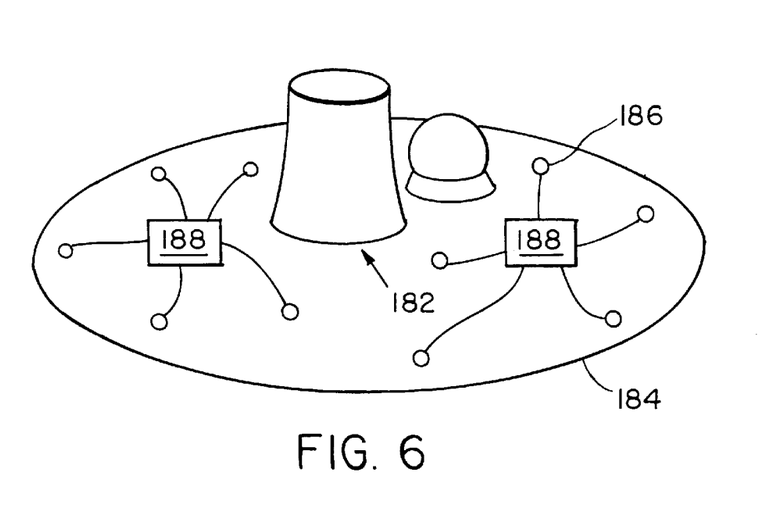
FIG. 6 is a schematic diagram illustrating the operation of a remediation system of the present invention.

FIG. 6 shows an embodiment of the remediation system. The perimeter 184 of the industrial facility 182 is provided with nozzles for injecting the remediating agent into the atmosphere surrounding the industrial facility 182. These nozzles 186 are supplied with remediating agents from reservoirs 188. In the case of a chemical or other type of release, the remediating agent is provided to the nozzles 186 over which the targeted agent will pass due to prevailing environmental conditions. In other embodiments, the agents may be installed in dispensers that can be triggered to inject the remediating agent into the atmosphere.

The remediating chemical can be a reagent or catalyst to deactivate the agent. Alternatively, particles may be absorbent to scrub the agent out of the atmosphere. For example, activated carbon would be used in this case. As with the probe chemicals, the remediating chemicals should also have a long residence time with the target agent. This will maximize the reaction time, minimizing the amount of the remediating chemical needed.

EXAMPLES

Hydrazine vapor, a highly toxic rocket propellant, is released at a distance of 1–150 km from the point of observation into a volume 31 meters in diameter, i.e., a total volume of 15,625 m³. An appropriate reactive body is solid particles of the conductive polymer poly(3-hexylthiophene). The polymer particles, which may be of any shape, have an initial electrical conductivity of between 0.1 and 3 S/cm, and have an initial average diameter of 0.1–5 micrometers. These polymers are described in U.S. Pat. No. 5,145,645, entitled "Conductive Polymer Selective Species Sensor" with a common inventor, and which is incorporation herein by the reference.

Figure 7:
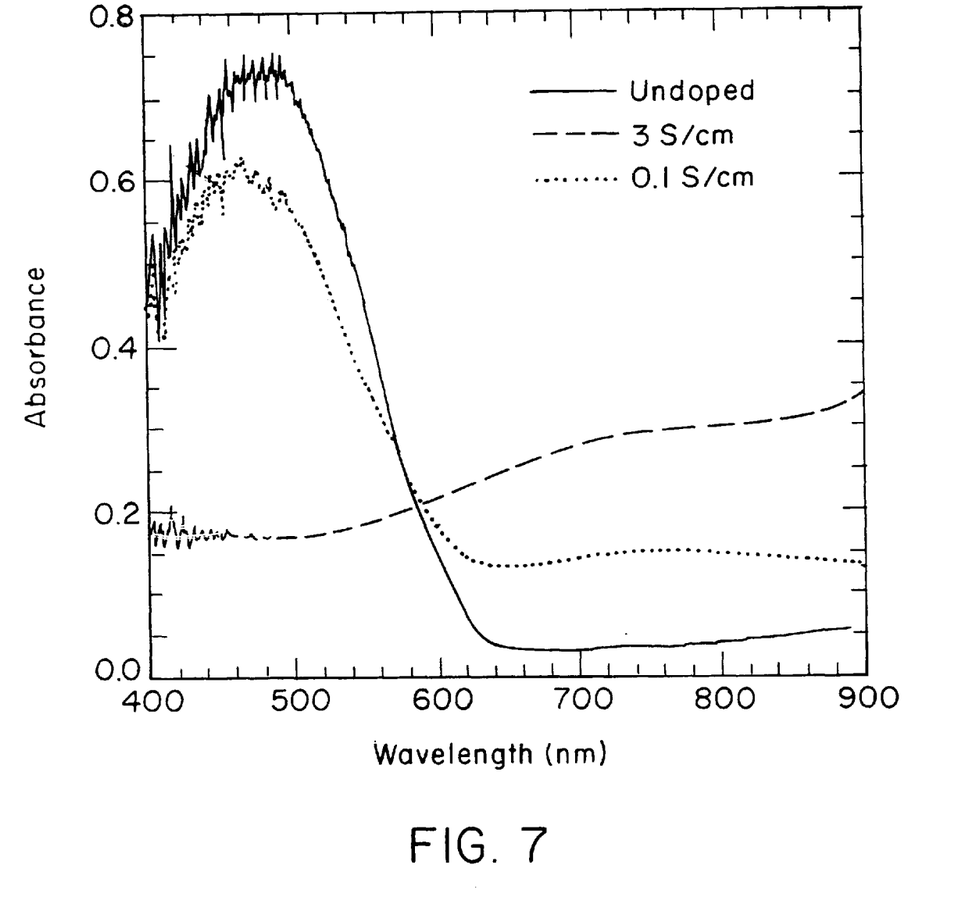
FIG. 7 is a plot of the optical absorption spectrum of polymer poly(3-hexylthiophene) showing the absorbance as a function of wavelength for various conductivities.

The optical absorption spectrum of the polymer particles changes strongly upon interaction with hydrazine. As shown in FIG. 7, the reduction in polymer conductivity caused by exposure to the hydrazine changes the absorbance. The unreacted polymer probe has a peak absorbance at approximately 500 nm. The reaction with hydrazine, indicated by the changes in conductivity to 0.1 and 3 S/cm, results in decrease absorbance at 500 nm and an increase in the 650–900 nm range. The ratio of backscattered DIAL return signal at two discrete wavelengths, preferably 500 nm and 750 nm, is used for detection and quantification of hydrazine vapor in the interrogated volume.

The ratio of particle absorbance A as a function of hydrazine dose (the product of concentration and interrogation time, in units of part-per-billion-hr) is given the following Table I for the case of 0.1 S/cm particles:

TABLE 1

| $A_{500}/A_{750}$ | Hydrazine Dose (ppb-hr) |
|---|---|
| 4.0 | 0 |
| 5.8 | 5.7 |
| 7.3 | 10.8 |
| 10.2 | 15.9 |
| 17.2 | 34.2 |
| 18.8 | ∞ |

In order to obtain a readily measured 10% extinction, approximately 10 lb of particles must be delivered to the volume.

In another example, tabun, sarin, soman, and/or GF nerve agents are released at a distance of 1–150 km from the point of observation into a volume 31 meters in diameter, i.e., a total volume of 15,625 m³. An appropriate reactive body is solid undoped particles of the conductive polymer poly(3,4 dimethylpyrrole) containing acetylcholinesterase. The polymer particles, which may be of any shape, have an initial average diameter of 0.1–5 micrometers.

Reaction of nerve chemical agents with acetylcholinesterase produces HF or HCN, depending on the agent, which increases the electrical conductivity of the particles, and changes the optical absorption spectrum.

The ratio of backscattered DIAL return signal at two discrete wavelengths, preferably 430 nm and 800 nm, is used for detection and quantification of hydrazine vapor in the interrogated volume. Note that $A_{430}/A_{800}$ changes from 2 (no exposure) to 0.5 (exposure to chemical agent).

Figure 8:
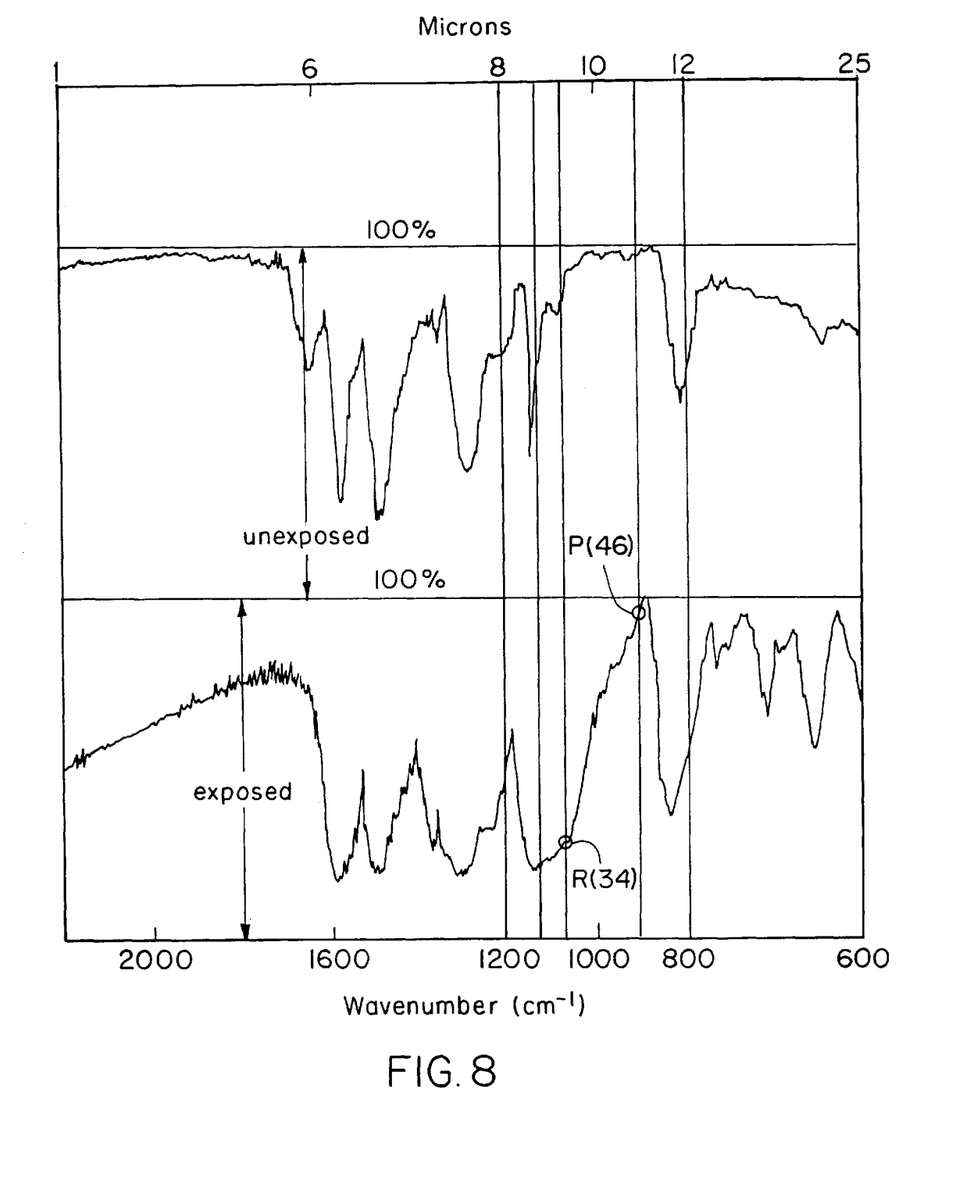
FIG. 8 is a plot of absorption (arbitrary scale) as a function of wave number for an unexposed and exposed polymer body.

FIG. 8 shows the changes in the absorption spectrum when undoped poly(aniline) particles are used containing acetylcholinesterase. The typical DIAL in the IR at 10.883 micrometers and 9.201 micrometers [P(46) and R(34) lines of the $CO_2$ laser, respectively] is then used to measure change in particle absorption spectrum upon the increase in particle conductivity when HF/HCN is produced by reaction of agent with acetylcholinesterase. Exposure induces changes in the absorption spectrum between 8–12 micrometers. Normalization is provided by the 9.201 micrometer line. The average diameter of the particles is as above. The P(46)/R(34) absorbance ratio changes from 1.2 (no exposure) to 4 (exposure to chemical agent).

In the passive IR detector, similar spectral properties apply by considering the related emission spectrum.

Table II below lists potential reactive probes for various chemical species and remediation chemical/techniques that may be utilized to deactivate or neutralize the species.

| Target Species | Reactive probe | Remediation Means |
|---|---|---|
| Tabun, Sarin, Soman, GF, VX, | color change: particles with immobilized acetylcholinesterase and indoxyl acetate or: color change: conductive polymer particles change color in presence of decomposition products HF and HCl or: conductivity change (i.e. use RADAR): conductive polymer particles change conductivity in presence of agents, decomposition products HF and HCl. | acidic/basic aqueous aerosol or hydrogel particles; use NaOH, chloramine, or bleach |
| Mustard agent | color change: particles with immobilized 4-(4-nitrobenzyl) pyridine and potassium carbonate | acidic/basic aqueous aerosol or hydrogel particles; use NaOH, chloramine, or bleach |
| HCN, tear gases, Lowisite | color change/conductivity change using conductive polymer particles | acidic/basic aqueous aerosol or hydrogel particles; use NaOH, chloramine, or bleach |
| Botulinum toxin, Staphylococcus enterotoxin (type B), | color change/conductivity change using conductive polymer particle or: particles with immobilized antibodies; get increase in particle size when toxin or | particles incorporating singlet oxygen generators such as methylene blue |

-continued

| Target Species | Reactive probe | Remediation Means |
|---|---|---|
| Saxitoxin, Ricin Anthrax, Bacillus *anthracis* | cells absorbs antibody on surface of particle color change/conductivity change using conductive polymer particle or: particles with immobilized antibodies; get increase in particle size when toxin or cells absorbs to antibody on surface of particle | particles incorporating singlet oxygen generators such as methylene blue |
| Hydrazine, MMH, UDMH | color change/conductivity change using conductive polymer particles | acidic or basic aqueous aerosol/hydrogel |
| HF, HCl $NO_x$, $SO_x$, etc. | color change/conductivity change using conductive polymer particles | acidic or basic aqueous aerosol/hydrogel |

While this invention has been particularly shown and described with references to preferred embodiments thereof, it will be understood by those skilled in the art that various changes in form and detail may be made therein without departing from the spirit and scope of the invention as defined by the appended claims.

We claim:

1. A method for analyzing a chemical or biological target agent dispersed in a volumetric region of an atmospheric medium, the method comprising:

selecting an interactive body that reacts with the target agent in the atmospheric medium to induce changes in an electromagnetic signature of the region occupied by the target agent;

seeding the body into a region of the atmospheric medium overlapping the region occupied by the target agent such that the body reacts with the target agent;

detecting electromagnetic radiation transmitted through the atmosphere from the seeded region; and analyzing the target agent based upon a detected electromagnetic signature from the volumetric region that was induced by a reaction between the body and the target agent.

2. The method of claim 1, further comprising:

selecting a body that will chemically react with the target agent; and analyzing the target agent based upon electromagnetic signatures from the seeded region indicative of a product of a reaction between the body and the target agent.

3. The method of claim 2, wherein the body-target agent reaction takes place on the body.

4. The method of claim 1, further comprising:

selecting a body that will physically interact with the target agent to change a particle color, size, electrical conductivity of the body or target agent; and analyzing the target agent based upon an electromagnetic signature from the seeded region indicative of a change induced by a reaction between the body and the target agent.

5. The method of claim 1, wherein the step of seeding the body comprises spraying the body from an aircraft.

6. The method of claim 1, wherein the step of dispensing the body comprises firing an artillery shell containing the body.

7. The method of claim 1, wherein the step of dispensing the body comprises dispersing the body from a remotely triggered explosive device.

8. The method of claim 1, wherein the step of dispensing the body comprises:

dispersing the body upwind of an atmospheric source of the target agent; and detecting the presence of the target agent at the source or downwind of the source.

9. The method of claim 1, further comprising:

formulating bodies to react with a plurality of different target agents; and identifying a type of target agent by measuring a reaction product between at least one of the bodies and the type of agent.

10. The method of claim 1, further comprising formulating a particle size of the body to select a residence time of the body with an agent in the medium.

11. The method of claim 1, further comprising transmitting electromagnetic radiation into the volumetric region including the target agent and analyzing the agent based upon the electromagnetic response to the electromagnetic radiation.

12. The method of claim 11, wherein the electromagnetic radiation is generated by a laser.

13. The method of claim 11, wherein the electromagnetic radiation is generated by a radar device.

14. The method of claim 1, further comprising:

locating the region including the agent; and dispensing a remediating agent into the region including the agent.

15. The method of claim 1, further comprising:

determining a type of the target agent; and dispensing a remediating agent into the region including the target agent to neutralize the target agent.

16. The method of claim 1 further comprising detecting radiation at a distance from a radiation source in a range of 1 km to 150 km.

17. The method of claim 1 further comprising detecting radiation at a range up to 150 km.

18. The method of claim 1 wherein the volumetric region comprises a gaseous atmospheric region.

19. A method for analyzing a chemical target agent dispersed in a volumetric region of an atmosphere, the method comprising:

selecting an interactive body to reside and interact with the target agent in the atmosphere to induce changes in an electromagnetic signature of the region occupied by the target agent;

seeding the body into a region of the medium overlapping the region occupied by the target agent such that the body reacts with the target agent;

illuminating the region with electromagnetic radiation from a source;

detecting electromagnetic radiation transmitted through the atmosphere from the seeded region with a detector at a distance in the range of 1 km to 150 km from the seeded region; and analyzing the target agent based upon a detected electromagnetic signature from the volumetric region that was induced by a reaction between the body and the target agent.

20. The method of claim 19, further comprising:

selecting a body that chemically reacts with the target agent; and analyzing the target agent based upon an electromagnetic signature from the seeded region indicative of a product of a reaction between the body and the target agent.

21. The method of claim 19, further comprising:

selecting a body that reacts with the target agent to change a particle color, size, or electrical conductivity of the body or target agent; and analyzing the target agent based upon an electromagnetic signature from the seeded region indicative of a change induced by a reaction between the body and the target agent.

22. The method of claim 19 wherein the source comprises a laser.

23. The method of claim 19 wherein the source comprises a radar source.

* * * * *